UNITED STATES PATENT OFFICE.

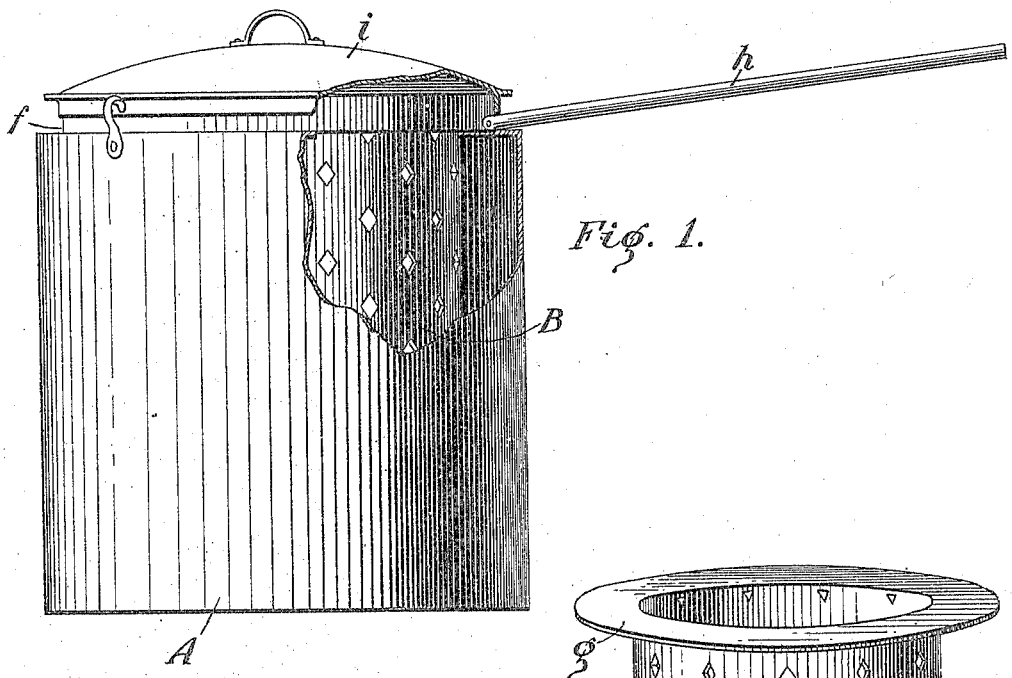
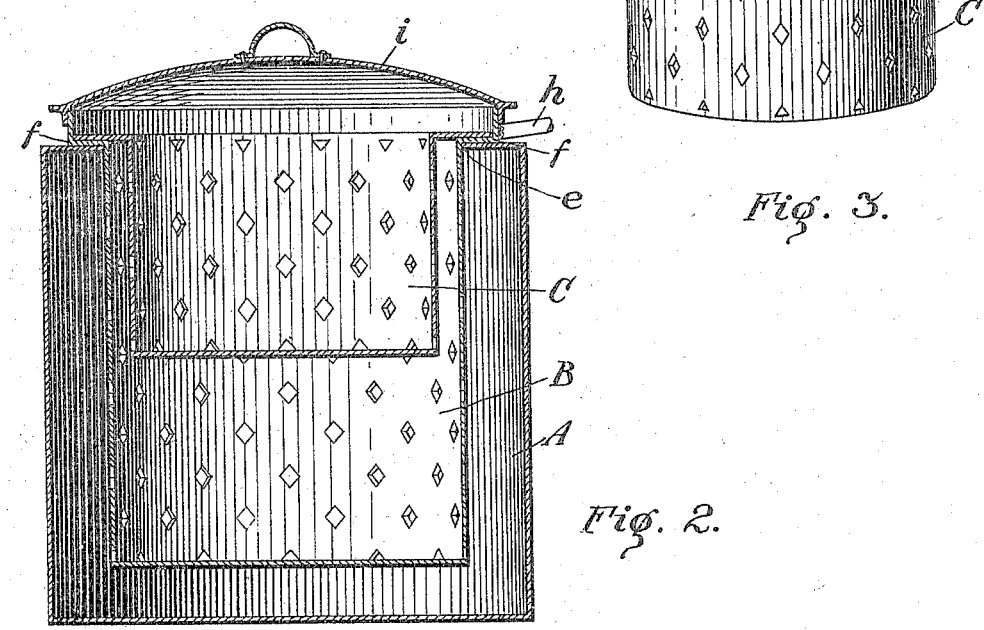

PAULINE WIEGAND, OF NEW YORK, N. Y.

FOOD BOILER AND STEAMER.

948,198.      Specification of Letters Patent.      Patented Feb. 1, 1910.

Application filed February 23, 1909. Serial No. 479,653.

*To all whom it may concern:*

Be it known that I, PAULINE WIEGAND, a citizen of the United States, residing in the borough of Brooklyn, city and State of New York, and county of Kings, have invented a new and useful Food Boiler and Steamer, of which the following is a specification.

My invention relates to improvements in cooking utensils for the cooking of food by boiling and steaming and preventing damage to same by burning in which an outer vessel (hereinafter called the "boiler") is used to hold the water which has to be boiled, said boiler being adapted to hold suspended therein in position whereby contents are in contact with the water, but not in contact with the base of said boiler, and damage by burning through evaporation of water, is thus prevented, an inner perforated vessel (hereinafter called "the perforated boiling pan") which contains the food when desired to be boiled, said perforated boiling pan being adapted, by means of the ledge formed by the collar $f$, to hold suspended by the flange $g$, in operating position, above the level, and free from contact with the water in said boiler and perforated boiling pan, a second inner, shallower, perforated vessel (hereinafter called the "perforated steaming pan"). The boiler and perforated boiling pan only are used together when food is to be boiled, but, when the whole or any portion of the food is to be cooked by the application of steam alone, and direct contact in the steaming pan with water is undesirable, all the three vessels, viz: boiler, perforated boiling pan, and perforated steaming pan, are used together. I attain these objects by mechanism illustrated in the accompanying drawings in which:

Figure 1 represents a view of the utensil having a portion of the outer boiler removed so as to disclose the position setting and supports of the perforated boiling pan when combined with the outer boiler and in operating position. Fig. 2 represents a sectional view of the entire utensil in operating position. Fig. 3 is a perspective view of the perforated steaming pan.

Similar letters refer to similar parts throughout the several views.

The boiler A differs from an ordinary boiling pot only in that it requires no independent lid, and has its mouth narrowed by the inner ledge $e$, adapted to support in operating position, the perforated boiling pan B, said perforated boiling pan being adapted to pass into the mouth of said boiler, fit snugly therein, and rest suspended by the collar $f$, which consitutes the upper portion of said boiling pan, on said ledge $e$, and, by this means, said perforated boiling pan is always held sufficiently above the base of said boiler A to prevent any damage to the cooking food by said boiler becoming hot, owing to unobserved evaporation of the water contents. The handle $h$ is attached to the side of that portion of the perforated boiling pan forming the collar $f$. The lid $i$ may be attached, or unattached, to the perforated boiling pan, and it closes the entire utensil.

The condition of cooking food may be examined, without disturbing said boiler A, at any time, by removing said lid, and, when cooked, said food, within said perforated boiling pan, is lifted out, by means of the handle $h$, which drains off into said boiler all surplus water, and the cooked food is then removed from said perforated boiling pan. The perforated steaming pan C is used, along with the boiler A and the perforated boiling pan B, when food is cooked by the application of steam only, and when contact therewith of water is undesirable, said perforated steaming pan C being a smaller perforated vessel, adapted to pass, bottom downward, with its contents, through the mouth of said perforated boiling pan B, until checked by the flange $g$, with which it is provided, and which said flange $g$ sustains said perforated steaming pan, same being thus supported in proper cooking position, with its bottom above the level of the water in the boiler A, by means of the collar $f$, which forms a ledge adapted to sustain said flange $g$. The lid $i$ covers said perforated boiling pan B, having said perforated steaming pan C inclosed therein, in operating position. The condition of food being cooked can be examined at any time by removing the lid $i$, and, when properly cooked, the boiling pan and its inclosed steaming pan containing the food, is lifted out of the boiler A, by the handle $h$, and the food removed from the steaming pan. Another utility is that my utensil is adapted to keep food, after having been cooked, warm, palatable, and wholesome, for a considerable time, for, if delay in serving is desirable, the water can be poured out of the boiler A and the vessels containing cooked food replaced in same, and the utensil and contents removed from the hot fire, to a moderately warm place which will keep the food in a satisfactory condition for an indefinite period.

The uses to which my utensil is applicable are various and numerous, including, among others, the cooking of vegetables, soups, puddings, eggs and omelets.

The process of manufacture varies so slightly from similar well-known systems as to call for no explanation, but, as I believe my combinations and modifications are novel and essentially useful, I therefore claim—

In a cooking utensil as described, the combination of an outer boiler having its mouth narrowed by an internal lateral flange with a boiling pan the lower portion of same being perforated and narrowed so as to be adapted to pass into and through the mouth of said boiler, the upper and wider portion being imperforate and forming a collar wider than the mouth of said boiler the base of said collar being adapted to be checked by, and to rest on, said internal lateral flange whereby its upper portion is sustained outside said boiler and above said internal lateral flange, and with a narrower and shallower perforated steaming pan, equipped with an external lateral flange at its mouth, adapted to pass within said boiling pan and to be supported therein in operating position with its base above water level, by the internal base of said collar engaging said external flange, substantially as shown and described.

PAULINE WIEGAND.

Witnesses:
 CARRIE HOLTON,
 F. O. WIEGAND.